US010380329B2

(12) United States Patent
Wang et al.

(10) Patent No.: US 10,380,329 B2
(45) Date of Patent: Aug. 13, 2019

(54) METHOD AND APPARATUS FOR PREVENTING APPLICATION FROM BEING DECIPHERED

(71) Applicant: Baidu Online Network Technology (Beijing) Co., Ltd., Beijing (CN)

(72) Inventors: Guiming Wang, Beijing (CN); Chenfu Bao, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 268 days.

(21) Appl. No.: 15/239,109

(22) Filed: Aug. 17, 2016

(65) Prior Publication Data

US 2017/0124306 A1    May 4, 2017

(30) Foreign Application Priority Data

Oct. 30, 2015   (CN) .......................... 2015 1 0728491

(51) Int. Cl.
*G06F 21/14*   (2013.01)
*G06F 9/455*   (2018.01)

(52) U.S. Cl.
CPC .......... *G06F 21/14* (2013.01); *G06F 9/45504* (2013.01)

(58) Field of Classification Search
CPC ............... G06F 21/14; G06F 8/41; G06F 8/61
See application file for complete search history.

(56) References Cited

U.S. PATENT DOCUMENTS

| | | | | |
|---|---|---|---|---|
| 2003/0236986 | A1* | 12/2003 | Cronce | G06F 21/14 713/189 |
| 2004/0158695 | A1* | 8/2004 | Ugen | G06F 9/30072 712/226 |
| 2010/0333090 | A1* | 12/2010 | Wright | G06F 9/45516 718/1 |

FOREIGN PATENT DOCUMENTS

CN           102831342 A    12/2012

* cited by examiner

*Primary Examiner* — Harunur Rashid
(74) *Attorney, Agent, or Firm* — Lathrop Gage LLP

(57) ABSTRACT

A method and apparatus for preventing an application from being deciphered are provided. In an embodiment of the method first virtual machine instructions corresponding to the application and to be parsed by a first virtual machine are obtained; a portion of the first virtual machine instructions is selected, and the portion of the first virtual machine instructions is converted into second virtual machine instructions to be parsed by a second virtual machine; and an executable file corresponding to the application is generated based on unconverted first virtual machine instructions in the first virtual machine instructions and on the second virtual machine instructions.

13 Claims, 5 Drawing Sheets

METHOD AND APPARATUS FOR PREVENTING APPLICATION FROM BEING DECIPHERED

CROSS-REFERENCE TO RELATED APPLICATION

This application is related to and claims priority from Chinese Application No. 201510728491.6, filed on Oct. 30, 2015, entitled "METHOD AND APPARATUS FOR PREVENTING APPLICATION FROM BEING DECIPHERED", the entire disclosure of which is hereby incorporated by reference.

TECHNICAL FIELD

The present application relates to the field of Internet, specifically to the field of application security, and more specifically, to a method and apparatus for preventing an application from being deciphered.

BACKGROUND

Currently, when a user installs an application, the installation is generally performed by downloading an installation package containing source code of the application. In the prior art, to prevent the application from being deciphered, that is, to prevent the source code in the installation package from being recovered, the source code in the installation package is encrypted in advance. When the encrypted source code is loaded in a memory for execution, the encrypted source code is decrypted, to prevent the application from being deciphered.

However, when the aforementioned method is implemented to prevent the application from being deciphered, the decrypted source code will ultimately be loaded in the memory in its entirety for execution, so that a deciphering program can still acquire the entire source code of the application by continuously capturing the code in the memory, thereby accomplishing the deciphering of the application.

SUMMARY

To solve the technical problem mentioned in the background, the present application provides a method and apparatus for preventing an application from being deciphered.

In a first aspect, the present application provides a method for preventing an application from being deciphered, the method including: obtaining first virtual machine instructions which are corresponding to the application and are to be parsed by a first virtual machine, the first virtual machine instructions being generated by compiling source code of the application, and the first virtual machine being a virtual machine parsing the first virtual machine instructions to generate machine instructions; selecting a portion of the first virtual machine instructions, and converting the portion of the first virtual machine instructions into second virtual machine instructions to be parsed by a second virtual machine, the second virtual machine being a virtual machine parsing the second virtual machine instructions to generate machine instructions; and generating an executable file corresponding to the application based on unconverted first virtual machine instructions in the first virtual machine instructions and on the second virtual machine instructions, such that when the executable file is executed, the first virtual machine and the second virtual machine execute the unconverted first virtual machine instructions and the second virtual machine instructions, respectively.

In a second aspect, the present application provides an apparatus for preventing an application from being deciphered, the apparatus including: an obtaining unit, configured to obtain first virtual machine instructions which are corresponding to the application and are to be parsed by a first virtual machine, the first virtual machine instructions being generated by compiling source code of the application, and the first virtual machine being a virtual machine parsing the first virtual machine instructions to generate machine instructions; a processing unit, configured to select a portion of the first virtual machine instructions, and convert the portion of the first virtual machine instructions into second virtual machine instructions to be parsed by a second virtual machine, the second virtual machine being a virtual machine parsing the second virtual machine instructions to generate machine instructions; and a generating unit, configured to generate an executable file corresponding to the application based on unconverted first virtual machine instructions in the first virtual machine instructions and on the second virtual machine instructions, such that when the executable file is executed, the first virtual machine and the second virtual machine execute the unconverted first virtual machine instructions and the second virtual machine instructions, respectively.

According to the method and apparatus for preventing an application from being deciphered, first virtual machine instructions which are corresponding to the application and are to be parsed by a first virtual machine are obtained; a portion of the first virtual machine instructions is selected and converted into second virtual machine instructions to be parsed by a second virtual machine; and an executable file corresponding to the application is generated based on unconverted first virtual machine instructions in the first virtual machine instructions and on the second virtual machine instructions, such that when the executable file is executed, the first virtual machine and the second virtual machine execute the unconverted first virtual machine instructions and the second virtual machine instructions, respectively. The first virtual machine instructions and the second virtual machine instructions can be parsed by the first virtual machine and the second virtual machine, respectively. Thus, even though a deciphering program extracts the virtual machine instructions corresponding to the source code of the application in its entirety from the memory, the first virtual machine instructions and the second virtual machine instructions cannot be distinguished, such that the deciphering program cannot recover the source code based on the obtained virtual machine instructions, and thus the application is prevented from being deciphered.

BRIEF DESCRIPTION OF THE DRAWINGS

After reading detailed descriptions of non-limiting embodiments with reference to the following accompanying drawings, other features, objectives and advantages of the present application will be more apparent.

DETAILED DESCRIPTION

The present application is further described in detail through the accompanying drawing and the embodiment. It should be understood that, the specific embodiments described herein are merely used to explain the relevant invention, and are not intended to limit the present invention. In addition, it should be further noted that, in order to facilitate the description, merely the parts related to the relevant invention are shown in the accompanying drawings.

It should be noted that, the embodiments of the present application and features in the embodiments may be combined on a non-conflict basis. The present application will be described in detail through the accompanying drawings and the embodiments.

Figure 1:
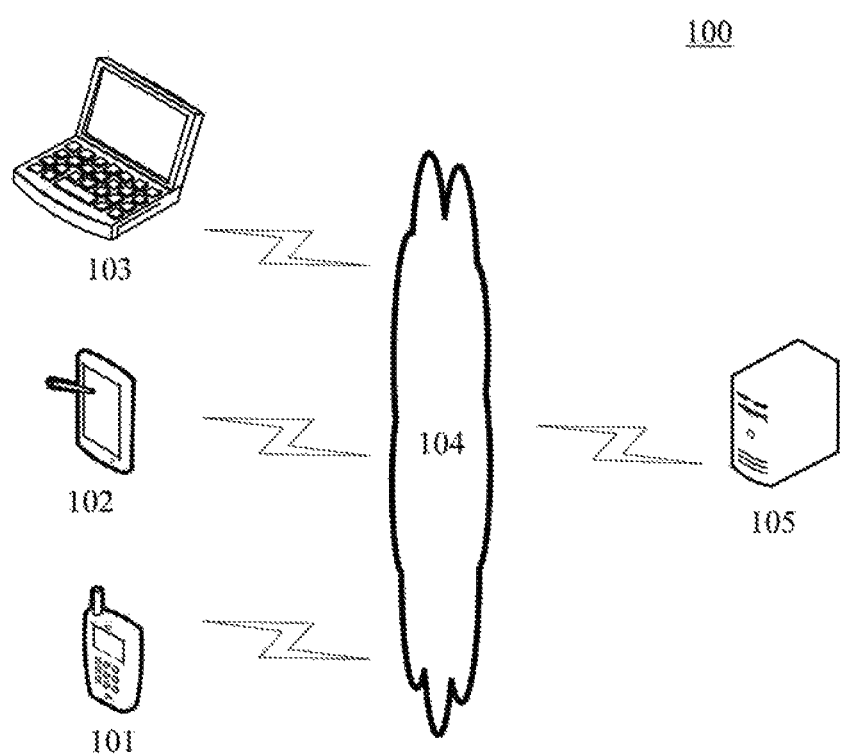
FIG. 1 is an exemplary system architectural diagram in which the present application can be implemented.

FIG. 1 shows an exemplary system architecture 100 in which the method or apparatus for preventing an application from being deciphered according to an embodiment of the present application can be applied.

As shown in FIG. 1, the system architecture 100 may include terminal devices 101, 102 and 103, a network 104 and a server 105. The network 104 is a medium configured to provide transmission links between the terminal devices 101, 102 and 103 and the server 105. The network 104 may include various types of connection, such as wired or wireless transmission links, or optical fibers.

The user may interact with the server 105 through the network 104 by using the terminal devices etc. The terminal devices 101, 102 and 103 may be provided with various communication applications, such as network security type applications and instant messaging tools.

The terminal devices 101, 102 and 103 may be different electronic devices having display screens and supporting network communication, including, but not limited to, smart phones, tablet computers, eBook readers, MP3 (Moving Picture Experts Group Audio Layer III) players, MP4 (Moving Picture Experts Group Audio Layer IV) players, laptop computers, and desktop computers.

The server 105 may be a server providing various services, for example, a server providing security support on applications on the terminal devices 101, 102 and 103. The server 105 may receive an application installation package downloading request sent from the terminal device 101, 102 or 103, process the installation package, and return a processing result (for example, an installation package containing a second virtual machine instruction) to the terminal device.

It should be understood that the numbers of the terminal devices, the network and the servers in FIG. 1 are merely schematic. According to practical requirements, any numbers of terminal devices, networks and servers may be provided.

Figure 2:
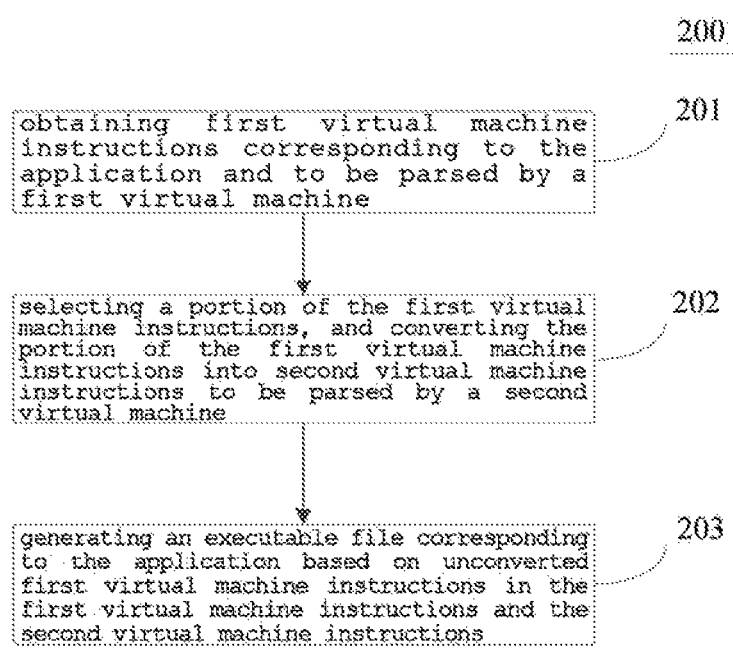
FIG. 2 is a flow chart showing an embodiment of a method for preventing an application being deciphered according to the present application.

Referring to FIG. 2, a flowchart 200 of a method for preventing an application from being deciphered according to an embodiment of the present application is shown. The method provided in this embodiment may be executed by the terminal device 101, 102 or 103 or the server 105 in FIG. 1. The method includes the following steps.

At step 201, first virtual machine instructions to be parsed by a first virtual machine corresponding to the application are obtained.

In this embodiment, the first virtual machine instructions are generated by compiling the source code of the application, and the first virtual machine is a virtual machine parsing the first virtual machine instructions to generate machine instructions. For example, when the source code of the application is Java code, the first virtual machine instructions may be Java byte code generated by compiling the Java code using a Java compiler, and accordingly, the first virtual machine may be a Java virtual machine executing the Java byte code.

It should be understood that the first virtual machine instructions being the Java byte code and the first virtual machine being the Java virtual machine exemplarily and concisely illustrate the corresponding relationship of the virtual machine and the virtual machine instructions, and the kind of the virtual machine is not limited by this embodiment. The basic principle of the virtual machine parsing virtual machine instructions to generate machine instructions described in the following is applicable to the Java virtual machine, as well as to other types of virtual machines.

Before the principle of the virtual machine parsing virtual machine instructions to generate machine instructions is explained, the basic principle of generating the machine instructions by the source code (such as C code or C++ code) of the application after being compiled is illustrated first: a CPU configured to execute the machine instructions has a corresponding instruction set (for example, an X86 instruction set). Accordingly, each operation (for example, a storage operation to write data into a memory) executed by the CPU is composed of multiple machine instructions. In the source code of the application, an operation executed by the CPU may be presented by one or more line of code, and when the source code is compiled, the source code may be parsed by the compiler running on a platform into instructions compatible to the platform (for example, Linux or Windows). Using the storage operation to write data into the memory as an example for the operation executed by the CPU, it can be assumed that the source code includes code corresponding to the storage operation. On the Linux platform, after the code is compiled by a compiler (for example, a GCC compiler) running on the Linux, multiple Linux instructions corresponding to the code may be generated, the multiple Linux instructions are converted into machine instructions, and the CPU executes the machine instructions obtained after the conversion, so as to execute the storage operation. On the Windows platform, after the code is compiled by a compiler (for example, a Visual Studio development tool) running on the Windows, multiple Windows instructions corresponding to the code in a Windows instruction set may be generated, the multiple Windows instructions are converted into machine instructions, and the CPU executes the machine instructions obtained after the conversion, so as to execute the storage operation.

Figure 3:
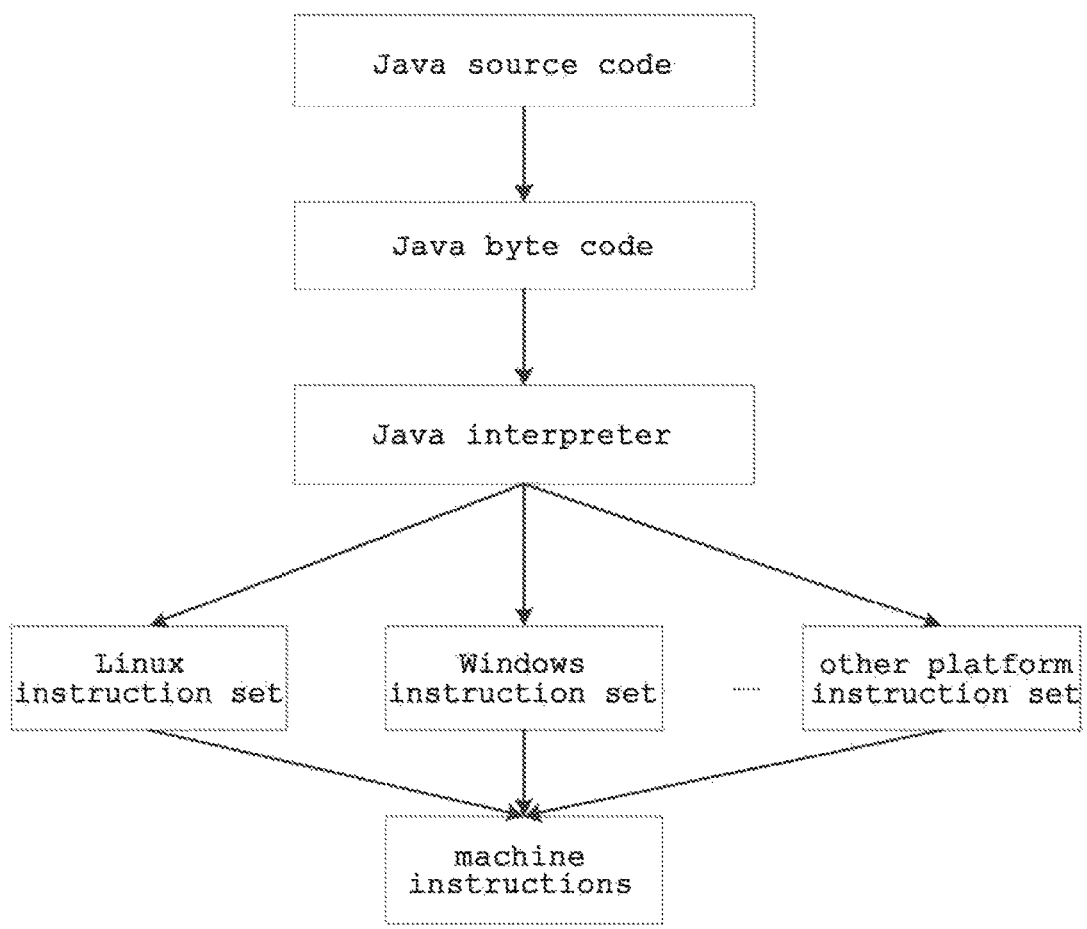
FIG. 3 is a principle diagram showing a Java virtual machine parsing a virtual machine instruction to generate a machine instruction.

Based on the basic principle of the machine instruction generation using the application source code after compilation, the principle of the virtual machine parsing the virtual machine instructions to generate the machine instructions will be discussed in the following. By using the Java virtual machine as the exemplary virtual machine, referring to FIG. 3, a principle diagram of a Java virtual machine parsing virtual machine instructions to generate machine instructions is shown. In FIG. 3, a Java compiler compiles the Java source code of the application into virtual machine instructions (Java byte code). Then, a Java interpreter in the Java virtual machine parses the Java byte code to generate instructions respectively applicable to different platforms according to different target platforms, and the instructions are converted into machine instructions. The machine instructions are executed by the CPU, thereby completing the corresponding operations. Using Java code enabling the CPU to execute the storage operation as an example, the Java code is initially converted into a Java byte code, the Java interpreter parses the Java byte code into Linux instructions corresponding to the storage operation on the Linux platform, that is, the Linux instructions corresponding to the storage operation are searched from the Linux instruction set, the Linux instructions are converted into machine instructions, and the CPU executes the machine instructions, thereby completing the storage operation.

At step 202, a portion of the first virtual machine instructions is selected, and the portion of the first virtual machine instructions is converted into second virtual machine instructions to be parsed by a second virtual machine.

In the embodiment, after obtaining the first virtual machine instructions of the application, a portion of the first virtual machine instructions may be selected. Using the first virtual machine instructions being the Java byte code and the first virtual machine being the Java virtual machine as an example, in the Java virtual machine specification, the Java byte code is set in a Class file, and therefore, the selecting of a portion of the first virtual machine instructions may be: selecting method code in the Class file, namely, the Java byte code corresponding to a method defined in the Class file, and using the Java byte code corresponding to the method in the Class file as the portion of the first virtual machine instructions.

In some alternative implementations of this embodiment, the first virtual machine and the second virtual machine are both Java virtual machines, and the first virtual machine instructions are Java byte code. In this embodiment, the first virtual machine may be a Java virtual machine that can directly execute the Java byte code. The Java virtual machine that can directly execute the Java byte code may also be referred to as a system Java virtual machine. The system Java virtual machine is provided with a complete Java Runtime Environment (JRE) including a core class library that needs to be accessed when the method defined in the Class file is executed. In this embodiment, the first virtual machine and the second virtual machine may be Java virtual machines applied on the Android platform, namely, Dalvik virtual machines. Accordingly, the first virtual machine may directly execute the Java byte code (also referred to as Dalvik byte code) applicable to the Android platform, and the second virtual machine may be a Dalvik virtual machine created based on the Java virtual machine specification.

It should be understood that, in this embodiment, the Java virtual machine may be defined as a virtual machine meeting the Java virtual machine specification. For example, it is specified in the Java virtual machine specification that the virtual machine instructions need to be set in a file (for example, the Class file) of a type defined in the Java virtual machine specification, the file of the defined type is loaded by a class loader to the Java virtual machine, and the virtual machine instructions in the file of the defined type are parsed by a file parser (for example, a Class file parser). Therefore, any virtual machine may be referred to as a Java virtual machine, as long as it meets the specification.

In this embodiment, after a portion of the first virtual machine instructions is selected, the portion of the first virtual machine instructions may be converted into the second virtual machine instructions to be parsed by the second virtual machine. The second virtual machine is a virtual machine that parses the second virtual machine instructions to generate machine instructions. Based on the principle of the virtual machine parsing the virtual machine instructions to generate the machine instructions, as illustrated in step 201, the basic principle of creating the second virtual machine and using the second virtual machine to parse the second virtual machine instructions to generate the machine instructions is described as follows: using the first virtual machine and the second virtual machine both being Java virtual machines and the first virtual machine instructions being the Java byte code as an example, the first virtual machine may be a system Java virtual machine that can directly execute the Java byte code. The instruction format of the second virtual machine instructions may be set first. Then, a Java interpreter of the second virtual machine for interpreting and executing the second virtual machine instructions is created, and the Java interpreter of the second virtual machine is used to convert the second virtual machine instructions into instructions respectively applicable to different platforms, that is, to interpret and execute the second virtual machine instructions. Finally, the instructions are converted into the machine instructions, and the CPU executes the machine instructions. In this embodiment, the Java interpreter of the second virtual machine may be implemented as below: based on the structure of the Java interpreter of the system virtual machine, the extraction of the operation code and operand in the virtual machine instructions by the Java interpreter of the system Java virtual machine may be improved, so that the operation code and operand may be extracted from the second virtual machine instructions based on the second virtual machine instruction format. The manners of interpreting and executing the exacted operation code and operand in the second virtual machine may still adopt that of interpreting and executing the operation code and operand by the system. Java virtual machine, that is, the exacted operation code and operand may be interpreted and executed according to the order of executing the operation code and operand in the stack of the system Java virtual machine, so that the second virtual machine instructions are interpreted and executed. In this embodiment, after the Java interpreter of the second virtual machine is created, as the next step, a Class file parser and a class loader adapted to the second virtual machine instructions may be created according to the Java virtual machine specification, thereby creating the second virtual machine.

In this embodiment, the second virtual machine may merely support conversion of some types of the first virtual machine instructions. Using the first virtual machine being the system Java virtual machine that can directly execute the Java byte code as an example, for the first virtual machine instructions (the Java byte code) having a complicated operation type, for example, instructions requiring the support of a core class library, the system Java virtual machine may execute this type of the first virtual machine instructions, and the second virtual machine does not convert this type of first virtual machine instructions, thereby reducing the system consumption.

In this embodiment, where the second virtual machine is a Java virtual machine, and when a Java interpreter of the second virtual machine is created, that is, when the Java interpreter of the second virtual machine is compiled, the Java interpreter of the second virtual machine may be compiled by using only the Java language, and the interpretation and execution on all second virtual machine instructions are all implemented by running the Java code. The Java interpreter of the second virtual machine may also be compiled by using both the Java language and the C language. For example, when the second virtual machine instructions are interpreted and executed, the interpretation and execution on complicated second virtual machine instructions are partially implemented by using C code, thereby enhancing the efficiency of executing the second virtual machine instructions. The Java interpreter of the second virtual machine may also be compiled by using only the C language, and the interpretation and execution on all the second virtual machine instructions are implemented by running C code. Since the C language is a low-level language, it is difficult to decipher, thereby further improving the security.

In this embodiment, where the first virtual machine and the second virtual machine are both Java virtual machines, and when the Java interpreter is used to interpret and execute the first virtual machine instructions and the second virtual machine instructions, an instruction sequence optimization process may be performed on the first virtual machine instructions and the second virtual machine instructions, and the first virtual machine instructions and the second virtual machine instructions are separated from data. For example, a virtual machine instruction queue and a data queue are set, respectively. The virtual machine instruction queue stores only instructions, while registers and data to be accessed by the virtual machine instructions are stored in the data queue. An instruction pointer and a data pointer point to the instruction queue and the data queue, respectively.

In some alternative implementations of this embodiment, converting the portion of the first virtual machine instructions into second virtual machine instructions to be parsed by a second virtual machine includes: converting the portion of the first virtual machine instructions into the second virtual machine instructions, based on a corresponding relationship table of the first virtual machine instructions and the second virtual machine instructions.

In this embodiment, the first virtual machine instructions and the second virtual machine instructions may have a fixed mapping relationship. The corresponding relationship table of the first virtual machine instructions and the second virtual machine instructions may be established first, and the portion of the first virtual machine instructions is converted into the second virtual machine instructions, based on the corresponding relationship table of the first virtual machine instructions and the second virtual machine instructions. Moreover, an encryption process may be performed individually on a first virtual machine instruction or a second virtual machine instruction.

At step 203, an executable file corresponding to the application is generated based on unconverted first virtual machine instructions in the first virtual machine instructions and on the second virtual machine instructions.

In this embodiment, the executable file corresponding to the application is generated based on unconverted first virtual machine instructions in the first virtual machine instructions and on the second virtual machine instructions, such that when the executable file is executed, the first virtual machine and the second virtual machine execute the unconverted first virtual machine instructions and the second virtual machine instructions, respectively.

Using the application being an Android application compiled with Java code as an example, the Java source code of the Android application may be compiled in Java, so as to obtain corresponding first virtual machine instructions (Java byte code). Then, a portion of the first virtual machine instructions is converted into second virtual machine instructions, and a Class file corresponding to the unconverted first virtual machine instructions and a Class file corresponding to the second virtual machine instructions are generated respectively. Finally, a Dex file format conversion tool may be used to convert the Class files into Dex files, and resource files required for running the Android application and the Dex files are packaged, so as to finally generate an Android Package (APK) file. Accordingly, after a user installs the application by using the APK file, when the application runs, that is, the Dex files are executed, the executed virtual machine instructions are the first virtual machine instructions and the second virtual machine instructions. Therefore, even though a deciphering program obtains the virtual machine instructions corresponding to the source code of the application in its entirety loaded in the memory, the first virtual machine instructions and the second virtual machine instructions cannot be distinguished since the corresponding relationship of the first virtual machine instructions and the second virtual machine instructions cannot be determined, such that the deciphering program cannot recover the source code of the application.

In some alternative implementations of this embodiment, the method further includes: packaging the executable file and source code of the second virtual machine to generate an installation package file corresponding to the application, after the generating of an executable file corresponding to the application based on unconverted first virtual machine instructions in the first virtual machine instructions and on the second virtual machine instructions.

In this embodiment, after a portion of the first virtual machine instructions is converted into the second virtual machine instructions, the executable file containing the unconverted first virtual machine instructions and the second virtual machine instructions and the source code of the second virtual machine may be packaged to generate the installation package file corresponding to the application. Using the application being an Android application compiled with Java code as an example, the Dex file and the source code of the second virtual machine may be packaged to generate an APK file. When the user downloads the APK file and installs the application, the second virtual machine may be installed at the same time. When the application runs, the second virtual machine executes the second virtual machine instructions in the Dex file.

Figure 4:
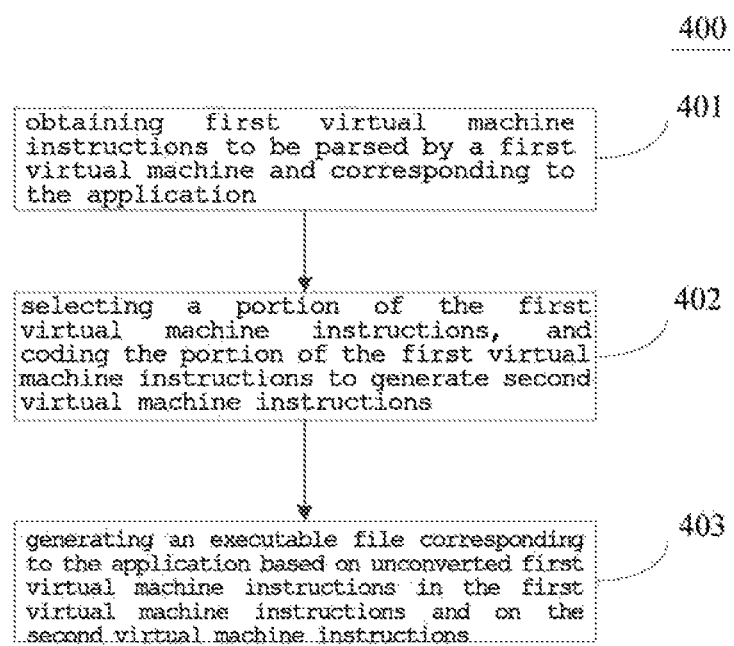
FIG. 4 is a flow chart showing another embodiment of a method for preventing an application from bring deciphered according to the present application.

Referring to FIG. 4, a flow chart 400 of the method for preventing an application from being deciphered according to another embodiment of the present application is shown. The method provided in this embodiment may be executed by the terminal device 101, 102 or 103 or the server 105 in FIG. 1. The method includes the following steps.

At step 401, first virtual machine instructions to be parsed by a first virtual machine and corresponding to the application are obtained.

In this embodiment, the first virtual machine instructions are generated by compiling the source code of the application, and the first virtual machine is a virtual machine parsing the first virtual machine instructions to generate machine instructions. For example, when the source code of the application is Java code, the first virtual machine instructions may be Java byte code generated by compiling the Java code using a Java compiler, and accordingly, the first virtual machine may be a Java virtual machine executing the Java byte code.

At step 402, a portion of the first virtual machine instructions is selected, and the portion of the first virtual machine instructions is coded to generate second virtual machine instructions.

In the embodiment, after obtaining the first virtual machine instructions of the application, a portion of the first virtual machine instructions may be selected. Using the first virtual machine instructions being the Java byte code and the first virtual machine being the Java virtual machine as an example, in the Java virtual machine specification, the Java byte code is set in a Class file, and therefore, the selecting of a portion of the first virtual machine instructions may be: selecting method code in the Class file, namely, the Java byte code corresponding to a method defined in the Class file, and using the Java byte code corresponding to the method in the Class file as the portion of the first virtual machine instructions.

In this embodiment, the selected portion of the first virtual machine instructions may be converted into the second virtual machine instructions by: extracting operation code and an operand in the portion of the first virtual machine instructions; and encoding the operation code and operand in a preset instruction format corresponding to the second virtual machine instructions, so as to generate the second virtual machine instructions. In this embodiment, the preset instruction format corresponding to the second virtual machine instructions may be preset, and may define the length of the operation code and operand and their positions in the second virtual machine instructions. Then, the operation code and operand extracted from the first virtual machine instructions may be converted into the length defined in the preset instruction format, the converted operation code and operand are set at corresponding positions in the preset instruction format, such that the selected portion of the first virtual machine instructions is converted into the second virtual machine instructions.

In some alternative implementations of this embodiment, the method further includes: setting a length of a field corresponding to the operation code and operand in the second virtual machine instructions, and adjusting the preset instruction format based on the length of the field. In this embodiment, the length of the field corresponding to the operation code and operand in the second virtual machine instructions may be preset, so as to randomly set the instruction format of the second virtual machine instructions in the process of converting the first virtual machine instructions into the second virtual machine instructions to achieve the random generation of the second virtual machine instructions. Then, the first virtual machine instructions including the operation code and operand are converted into the randomly generated second virtual machine instructions, so as to achieve the dynamic mapping between the first virtual machine instructions and the second virtual machine instructions, which may further improve the security.

At step 403, an executable file corresponding to the application is generated based on unconverted first virtual machine instructions in the first virtual machine instructions and on the second virtual machine instructions.

In this embodiment, the executable file corresponding to the application is generated based on unconverted first virtual machine instructions in the first virtual machine instructions and on the second virtual machine instructions, such that when the executable file is executed, the first virtual machine and the second virtual machine execute the unconverted first virtual machine instructions and the second virtual machine instructions, respectively. In this embodiment, the executable file and the source code of the second virtual machine may be packaged to generate the installation package file corresponding to the application. Using the application being an Android application compiled with Java code as an example, the Dex file and the source code of the second virtual machine may be packaged to generate an APK file. When the user downloads the APK file and installs the application, the second virtual machine may be installed at the same time. When the application runs, the second virtual machine executes the second virtual machine instructions in the Dex file.

Figure 5:
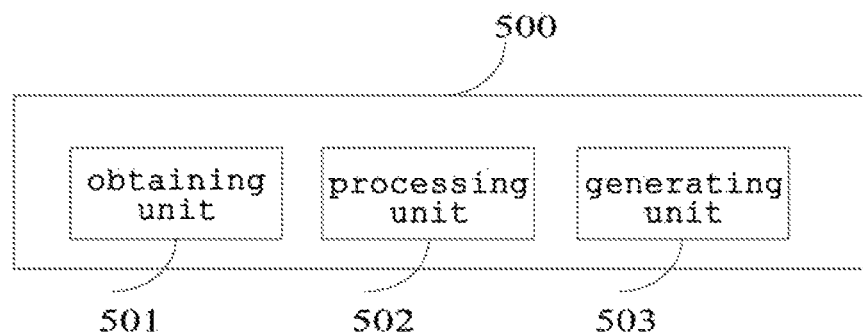
FIG. 5 is a schematic structural diagram showing an embodiment of an apparatus for preventing an application from being deciphered according to the present application.

Referring to FIG. 5, a schematic structural diagram of an apparatus for preventing an application from being deciphered according to an embodiment of the present application is shown. The apparatus 500 includes: an obtaining unit 501, a processing unit 502 and a generating unit 503. The obtaining unit 501 is configured to obtain first virtual machine instructions corresponding to the application and are to be parsed by a first virtual machine, the first virtual machine instructions being generated by compiling source code of the application, and the first virtual machine being a virtual machine parsing the first virtual machine instructions to generate machine instructions; the processing unit 502 is configured to select a portion of the first virtual machine instructions, and converting the portion of the first virtual machine instructions into second virtual machine instructions to be parsed by a second virtual machine, the second virtual machine being a virtual machine parsing the second virtual machine instructions to generate machine instructions; and the generating unit 503 is configured to generate an executable file corresponding to the application based on unconverted first virtual machine instructions in the first virtual machine instructions and on the second virtual machine instructions, such that when the executable file is executed, the first virtual machine and the second virtual machine execute the unconverted first virtual machine instructions and the second virtual machine instructions, respectively.

In some alternative implementations of this embodiment, each of the first virtual machine and the second virtual machine is a Java virtual machine, and the first virtual machine instructions are Java byte code.

In some alternative implementations of this embodiment, the apparatus 500 further includes: an installation package generating unit (not shown), configured to package the executable file and source code of the second virtual machine to generate an installation package file corresponding to the application, after the generating of an executable file corresponding to the application based on unconverted first virtual machine instructions in the first virtual machine instructions and on the second virtual machine instructions.

In some alternative implementations of this embodiment, the processing unit 502 includes: a first converting sub-unit (not shown), configured to convert the portion of the first virtual machine instructions into the second virtual machine instructions, based on a corresponding relationship table of the first virtual machine instructions and the second virtual machine instructions.

In some alternative implementations of this embodiment, the processing unit 502 includes: an extracting sub-unit (not shown), configured to extract operation code and an operand in the portion of the first virtual machine instructions; and a second converting sub-unit (not shown), configured to encode the operation code and operand in a preset instruction format corresponding to the second virtual machine instructions, so as to generate the second virtual machine instructions.

In some alternative implementations of this embodiment, the apparatus 500 further includes: an adjusting unit (not shown), configured to set a length of a field corresponding to the operation code and operand in the second virtual machine instructions, and adjust the preset instruction format based on the length of the field.

Figure 6:
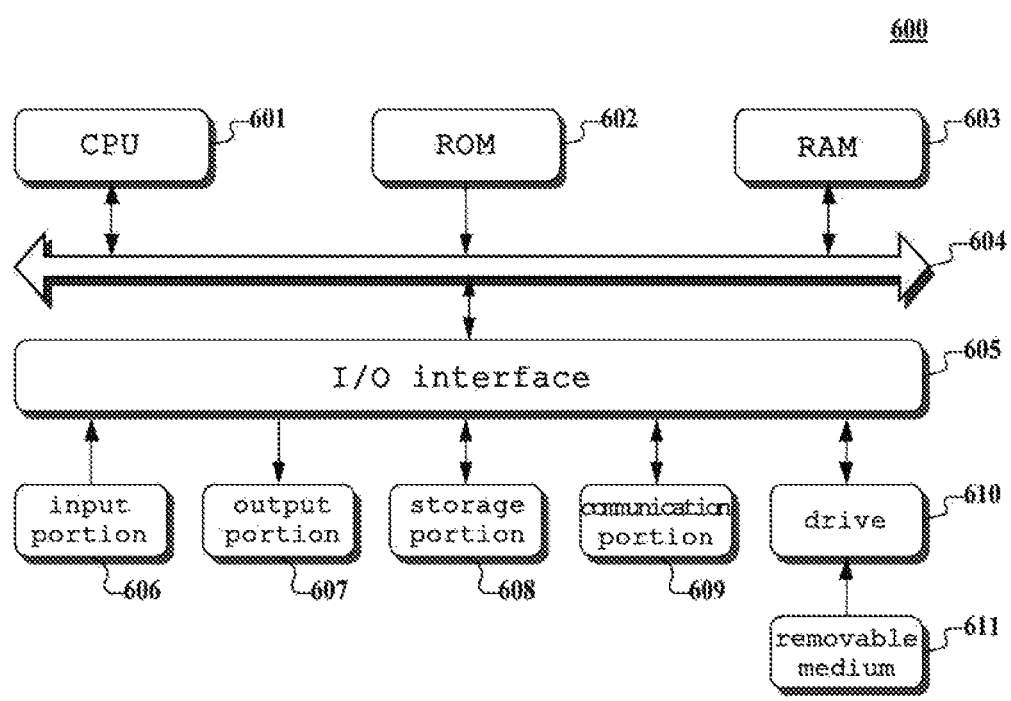
FIG. 6 is a schematic structural diagram of a computer system of a terminal device or a server applicable to implement the embodiment of the present application.

FIG. 6 shows a schematic structural diagram of a computer system adapted to implement a terminal apparatus or a server of the embodiments of the present application.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A drive 610 is also connected to the I/O interface 605 as needed. A removable medium 611, such as a magnetic disk, an optical disk, a magneto-optical disk, and a semiconductor memory, may be placed on the drive 610, to enable the retrieval of a computer program from the removable medium 611, and the installation thereof on the storage portion 608 as needed.

In particular, according to an embodiment of the present disclosure, the process described above with reference to FIG. 2 may be implemented in a computer software program. For example, an embodiment of the present disclosure includes a computer program product, which comprises a computer program that is tangibly embedded in a machine-readable medium. The computer program comprises program codes for executing the method of FIG. 2. In such an embodiment, the computer program may be downloaded and installed from a network via the communication portion 609, and/or may be installed from the removable media 611.

The flow charts and block diagrams in the figures illustrate architectures, functions and operations that may be implemented according to the system, the method and the computer program product of the various embodiments of the present invention. In this regard, each block in the flowcharts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. When the one or more programs are executed by a device, the device is to: obtain first virtual machine instructions corresponding to the application and to be parsed by a first virtual machine, the first virtual machine instructions being generated by compiling source code of the application, and the first virtual machine being a virtual machine parsing the first virtual machine instructions to generate machine instructions; select a portion of the first virtual machine instructions, and convert the portion of the first virtual machine instructions into second virtual machine instructions to be parsed by a second virtual machine, the second virtual machine being a virtual machine parsing the second virtual machine instructions to generate machine instructions; and generate an executable file corresponding to the application based on unconverted first virtual machine instructions in the first virtual machine instructions and on the second virtual machine instructions, such that when the executable file is executed, the first virtual machine and the second virtual machine execute the unconverted first virtual machine instructions and the second virtual machine instructions, respectively.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for preventing an application from being deciphered, the method comprising:

obtaining first virtual machine instructions corresponding to the application and to be parsed by a first virtual machine, the first virtual machine instructions being generated by compiling source code of the application, and the first virtual machine being configured to perform instructions requiring support of a core class library, and being a virtual machine parsing the first virtual machine instructions to generate machine instructions;

selecting a portion of the first virtual machine instructions, the selected portion of the first virtual machine instructions excluding the instructions requiring the support of the core class library, and converting the portion of the first virtual machine instructions into second virtual machine instructions to be parsed by a second virtual machine, the second virtual machine being configured to perform instructions excluding the instructions requiring support of the core class library, and being a virtual machine parsing the second virtual machine instructions to generate machine instructions, wherein the second virtual machine instructions are different from the first virtual machine instructions, and a virtual machine instruction queue and a data queue are set, the virtual machine instruction queue storing only instructions, registers and data to be accessed by the virtual machine instructions being stored in the data queue, and an instruction pointer and a data point pointing to the instruction queue and the data queue respectively, wherein converting the portion of the first virtual machine instructions into second virtual machine instructions to be parsed by a second virtual machine comprises:

extracting operation code and an operand in the portion of the first virtual machine instructions, and encoding the operation code and operand in a preset instruction format corresponding to the second virtual machine instructions, so as to generate the second virtual machine instructions;

generating an executable file corresponding to the unconverted first virtual machine instructions and the second virtual machine instructions based on unconverted first virtual machine instructions in the first virtual machine instructions and the second virtual machine instructions, such that when the executable file is executed, the first virtual machine and the second virtual machine execute the unconverted first virtual machine instructions and the second virtual machine instructions, respectively;

executing the executable file using the first virtual machine and the second virtual machine; and setting a length of a field corresponding to the operation code and operand in the second virtual machine instructions, and adjusting the preset instruction format based on the length of the field.

2. The method according to claim 1, wherein each of the first virtual machine and the second virtual machine is a Java virtual machine, and the first virtual machine instructions are Java byte code.

3. The method according to claim 1, further comprising: packaging the executable file and source code of the second virtual machine to generate an installation package file corresponding to the application, after the generating of an executable file corresponding to the application based on unconverted first virtual machine instructions in the first virtual machine instructions and on the second virtual machine instructions.

4. The method according to claim 3, wherein the converting of the portion of the first virtual machine instructions into second virtual machine instructions to be parsed by a second virtual machine comprises:

converting the portion of the first virtual machine instructions into the second virtual machine instructions, based on a corresponding relationship table of the first virtual machine instructions and the second virtual machine instructions.

5. The method according to claim 1, wherein the second virtual machine comprises a second interpreter for parsing the second virtual machine instructions, and the second interpreter are compiled by different languages.

6. A non-transitory computer storage medium storing a computer program, which when executed by one or more computers, cause the one or more computers to perform operations, the operations comprising obtaining first virtual machine instructions corresponding to the application and to be parsed by a first virtual machine, the first virtual machine instructions being configured to perform instructions requiring support of a core class library, and being generated by compiling source code of the application, and the first virtual machine being a virtual machine parsing the first virtual machine instructions to generate machine instructions;

selecting a portion of the first virtual machine instructions, the selected portion of the first virtual machine instruction excluding the instructions requiring the support of the core class library and converting the portion of the first virtual machine instructions into second virtual machine instructions to be parsed by a second virtual machine, the second virtual machine being configured to perform instructions excluding the instructions requiring support of the core class library, and being a virtual machine parsing the second virtual machine instructions to generate machine instructions, wherein the second virtual machine instructions are different from the first virtual machine instructions, and a virtual machine instruction queue and a data queue are set, the virtual machine instruction queue storing only instructions, registers and data to be accessed by the virtual machine instructions being stored in the data queue, and an instruction pointer and a data point pointing to the instruction queue and the data queue respectively, wherein converting the portion of the first virtual machine instructions into second virtual machine instructions to be parsed by a second virtual machine comprises extracting operation code and an operand in the portion of the first virtual machine instructions, and encoding the operation code and operand in a preset instruction format corresponding to the second virtual machine instructions, so as to generate the second virtual machine instructions;

generating an executable file corresponding to the unconverted first virtual machine instructions and the second virtual machine instructions based on unconverted first virtual machine instructions in the first virtual machine instructions and the second virtual machine instructions, such that when the executable file is executed, the first virtual machine and the second virtual machine execute the unconverted first virtual machine instructions and the second virtual machine instructions, respectively;

executing the executable file using the first virtual machine and the second virtual machine; and setting a length of a field corresponding to the operation code and operand in the second virtual machine instructions, and adjusting the preset instruction format based on the length of the field.

7. The non-transitory computer storage medium according to claim 6, wherein each of the first virtual machine and the second virtual machine is a Java virtual machine, and the first virtual machine instructions are Java byte code.

8. The non-transitory computer storage medium according to claim 6, wherein the operations further comprise: packaging the executable file and source code of the second virtual machine to generate an installation package file corresponding to the application, after the generating of an executable file corresponding to the application based on unconverted first virtual machine instructions in the first virtual machine instructions and on the second virtual machine instructions.

9. The non-transitory computer storage medium according to claim 8, wherein the converting of the portion of the first virtual machine instructions into second virtual machine instructions to be parsed by a second virtual machine comprises:

converting the portion of the first virtual machine instructions into the second virtual machine instructions, based on a corresponding relationship table of the first virtual machine instructions and the second virtual machine instructions.

10. A device for preventing an application from being deciphered, comprising:
at least one processor; and a memory storing instructions, which when executed by the at least one processor, cause the at least one processor to perform operations, the operations comprising:
obtaining first virtual machine instructions corresponding to the application and to be parsed by a first virtual machine, the first virtual machine instructions being generated by compiling source code of the application, and the first virtual machine being configured to perform instructions requiring support of a core class library, and being a virtual machine parsing the first virtual machine instructions to generate machine instructions;
selecting a portion of the first virtual machine instructions, the selected portion of the first virtual machine instruction excluding the instructions requiring the support of the core class library, and converting the portion of the first virtual machine instructions into second virtual machine instructions to be parsed by a second virtual machine, the second virtual machine being configured to perform instructions excluding the instructions requiring support of the core class library, and being a virtual machine parsing the second virtual machine instructions to generate machine instructions, wherein the second virtual machine instructions are different from the first virtual machine instructions, and a virtual machine instruction queue and a data queue are set, the virtual machine instruction queue storing only instructions, registers and data to be accessed by the virtual machine instructions being stored in the data queue, and an instruction pointer and a data point pointing to the instruction queue and the data queue respectively, wherein converting the portion of the first virtual machine instructions into second virtual machine instructions to be parsed by a second virtual machine comprises:
extracting operation code and an operand in the portion of the first virtual machine instructions, and
encoding the operation code and operand in a preset instruction format corresponding to the second virtual machine instructions, so as to generate the second virtual machine instructions;
generating an executable file corresponding to the unconverted first virtual machine instructions and the second virtual machine instructions based on unconverted first virtual machine instructions in the first virtual machine instructions and the second virtual machine instructions, such that when the executable file is executed, the first virtual machine and the second virtual machine execute the unconverted first virtual machine instructions and the second virtual machine instructions, respectively;
executing the executable file using the first virtual machine and the second virtual machine and
setting a length of a field corresponding to the operation code and operand in the second virtual machine instructions, and adjusting the preset instruction format based on the length of the field.

11. The device according to claim 10, wherein each of the first virtual machine and the second virtual machine is a Java virtual machine, and the first virtual machine instructions are Java byte code.

12. The device according to claim 10, wherein the operations further comprise: packaging the executable file and source code of the second virtual machine to generate an installation package file corresponding to the application, after the generating of an executable file corresponding to the application based on unconverted first virtual machine instructions in the first virtual machine instructions and on the second virtual machine instructions.

13. The device according to claim 12, wherein the converting of the portion of the first virtual machine instructions into second virtual machine instructions to be parsed by a second virtual machine comprises:
converting the portion of the first virtual machine instructions into the second virtual machine instructions, based on a corresponding relationship table of the first virtual machine instructions and the second virtual machine instructions.

* * * * *